Oct. 13, 1936.  S. MUNSON  2,057,391
BALL BEARING STRUCTURE
Filed April 2, 1935
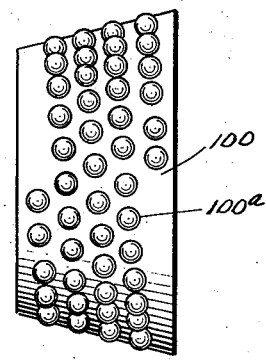
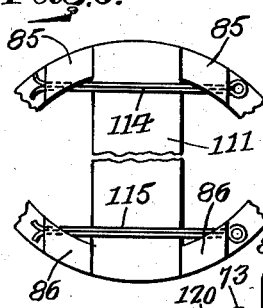
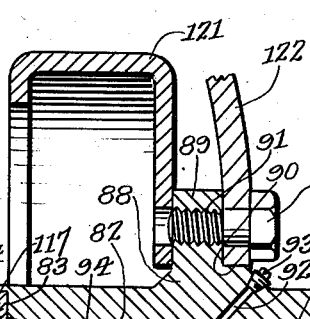
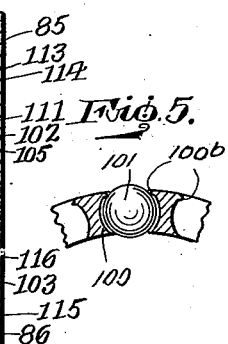
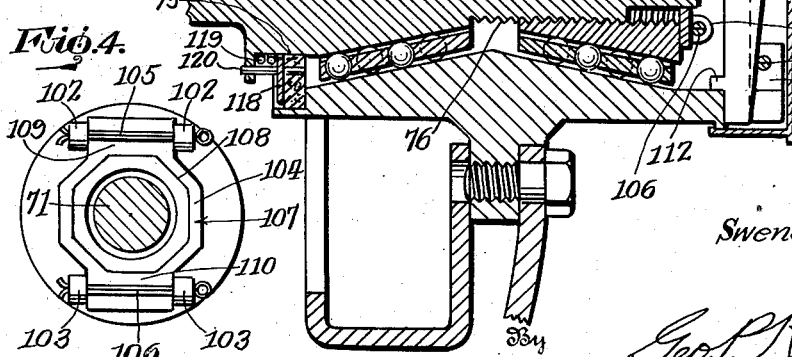
Inventor
Sweney Munson
Geo. S. Kimmel
Attorney Patented Oct. 13, 1936

2,057,391

UNITED STATES PATENT OFFICE 2,057,391

BALL BEARING STRUCTURE

Sweney Munson, Chelsea, Okla.

Application April 2, 1935, Serial No. 14,322

8 Claims. (Cl. 308—189)

My invention relates to a ball bearing structure for use in connection with railway cars and automotive vehicles.

My invention has for its object to provide, in a manner as hereinafter set forth, a ball bearing structure whereby the wear on the raceway surfaces due to the action of the bearing balls thereon will be distributed evenly over said surfaces for maintaining the normal longitudinal play of the cage carrying the balls.

My invention has for its further object to provide, in a manner as hereinafter set forth, a ball bearing structure including bearing ball cages within ball raceways formed by a race member and a pair of cones, with the balls in each cage disposed in a spiral row whereby the wear on the surfaces of the raceways by the action of the bearing balls will be distributed evenly over said surfaces for maintaining the normal longitudinal play of the cages.

My invention has for its further object to provide, in a manner as hereinafter set forth, a ball bearing structure including bearing ball cages within ball raceways formed by a race member and a pair of cones and with the balls in each case disposed in a spiral row whereby the wear on the surfaces of the raceways by the action of the bearing balls will be distributed evenly over said surfaces for maintaining the normal longitudinal play of the cages, and further permitting free relative adjustment between a cone and the race member to tighten the bearing.

Further objects of my invention are to provide, in a manner as hereinafter set forth, a ball bearing structure which is comparatively simple in its construction and arrangement, strong, durable, compact, thoroughly efficient in its use, readily assembled and comparatively inexpensive to set up.

With the foregoing and other objects which may hereinafter appear, my invention consists of such parts and such combination of parts as are hereinafter more specifically described and illustrated in the accompanying drawing, wherein are shown embodiments of my invention, but it is to be understood that changes, variations and modifications may be resorted to which fall within the scope of the invention as claimed.

In the drawing:

Figure 1 is a longitudinal sectional view of the ball bearing structure installed with respect to the axle of an automotive truck, Figure 2 is a side elevation of the form of cage employed and with the cage having mounted therein bearing balls extended from the inner and outer faces thereof, Figure 3 is a fragmentary view in elevation looking towards the outer end of the race member, Figure 4 is an elevation looking towards the outer face of the adjustable cone retaining member, and Figure 5 is a detail section of the ball cage.

With reference to Figures 1 to 5: There is shown the axle 71 of an automotive truck or vehicle and which is encompassed, in spaced relation, by a tubular housing 72 of uniform inner diameter. The housing 72 is formed with a peripheral annular flange 73 and peripheral parts 74, 75, 76 and 77 of different outer diameters with respect to each other and a part 78 of gradually decreasing diameter from its inner to its outer end. The flange 73 is arranged between parts 74 and 75 and extends outwardly with respect to part 75. The part 74 is of less diameter than part 75. The part 76 is of less diameter than parts 74 and 75. The part 77 is of less diameter than part 76. The part 78 is interposed between parts 75 and 76. The junction of parts 76, 78 provides an annular shoulder 79. The part 76 is arranged between parts 75, 77. The junction of parts 76, 77 provides an annular shoulder 80. The parts 77, 78 are substantially of the same length and of greater length than parts 75, 77. The part 76 is threaded throughout. The other of the said parts are plain. The outer periphery of part 77 is of polygonal contour. The part 78 is termed an inner non-adjustable frusto cone and forms the inner wall of an inner raceway to be hereinafter referred to. Surrounding the parts 76, 77 is an internally threaded adjustable tubular member 81 having its outer diameter gradually increasing from its inner to its outer end. The member 81 is termed an outer adjustable frusto cone and has threaded engagement with the threads of part 76. The periphery of the member 81 forms the inner wall of an outer raceway to be referred to. The frusto cones are arranged in inner endwise alignment. The member 81 is adjusted relative to part 76 and part 78.

Surrounding the frusto cones in spaced relation is a tubular combined hub and race member 82 extending from over part 75 to beyond part 77. The member 82, at its inner end edge 83, is formed with an annular flange 84 flush with the outer face thereof. The member 82, at its outer end edge is provided with an upper and a lower pair of spaced aligning apertured lugs 85, 86 respectively. The member 82, at its outer end, is formed with a peripheral annular rib 87, and intermediate its ends with an annular offset 88 formed with an annular flange 89 and a shoulder 90 at the base of the flange. The latter is formed with a series of spaced threaded openings 91. The member 82 is also provided with an inclined lubricant duct 92 normally closed by a plug 93. The inner face of the member 82 is formed with a pair of oppositely disposed diverging portions 94, 95 and a portion 96 of uniform diameter into which merges the outer end of portion 95. The outer end of portion 94 is at the inner end edge 83 of member 82. The inner ends of portions 94, 95 merge into each other. The portions 94, 95 coact with the frusto cones to form inner and outer raceways 97, 98 respectively. The portions 94, 95 form the outer and the frusto cones the inner walls of the raceways 97, 98. The raceways are of diverging contour and are oppositely disposed.

Arranged in the raceways 97, 98 are cages 99, 100 respectively, carrying bearing balls 101. The cages are of like form and each of which gradually increases in outer and inner diameters from its inner to its outer end. Each cage is of frusto-conoidal contour and has its body of uniform thickness from end to end. Each cage is formed with a spiral row of spaced openings 101ª. The end openings of each row are arranged in close proximity to the end edges of the cage. The spirals of each row are closely related. The openings of one spiral are staggered with respect to the openings of adjacent spirals. The wall of each opening is of arcuate contour in vertical section, as shown in Figure 5. Arranged in each opening 101ª is a bearing ball 101 which projects from the outer and inner faces of the cage. The balls 101 are retained in the openings 101ª by a lip 101ᵇ (Figure 5) at the outer end of the wall of each opening 101ª. The lips 101ᵇ extend into the openings 101ª and reduce the outer ends of the latter to prevent balls from separating from the cages.

The member 81 is detachably locked to the axle housing through the median of an upper and a lower pair of spaced apertured lugs 102, 103, a locking member 104 and an upper and a lower cotter 105, 106. The lugs are integral with the outer edge of member 81. The member 104 is formed of a body part 107 having a polygonal shaped opening 108 and a pair of oppositely disposed stems 109, 110. The body part 107 is mounted on the part 77 of the axle housing. The stems are arranged between the pairs of lugs 102, 103. The cotters extend through the lugs and bear against the outer face of the stems 109, 110. The member 81 functions for the same purpose as the member 67.

Integral with the outer end of axle 71 and the outer end edge of member 82, between the lugs 85, 86, is a head member 111 formed with stems 112 bearing against the inner face of member 82. The outer face of member 111 is formed with a pair of spaced oppositely inclined surfaces 113 against which upper and lower cotter pins 114, 115 respectively are adapted to bear against for retaining the head member 111 in locking engagement with member 82. The cotters extend through the lugs 85, 86.

Arranged on the outer end of member 82 is a closure cap 116 having its rim seating against the side edge of rib 87.

Encompassing the part 75 is a felt wiper 117 which bears against the inner end edge 83 of member 82 and is surrounded by the flange 84.

Mounted on the part 75 is a washer 118 which bears against the outer face of wiper 117. Interposed between flange 73 and washer 118 and mounted on part 75 is a holding spring 119 for wiper 117. Carried by flange 73 and extending through washer 118 and into wiper 117 are guards 120 in the form of pins.

A brake housing is indicated at 121 and a wheel disc at 122. The disc 122 seats on shoulder 90, bears against one face of flange 89 and is anchored to the latter by the holdfast means 123.

What I claim is:

1. In a ball bearing structure a tubular axle housing having intermediate its ends a peripheral inherent conoidal shaped part constituting an inner frusto-cone and a peripherally threaded portion disposed inwardly of and extending outwardly from the inner end of said cone, said cone increasing in diameter from its inner to its outer end, a hollow internally threaded outer-frusto cone, encompassing and adjustably connected to said threaded portion and arranged in endwise opposed relation to the said other cone, said outer cone increasing in outer diameter from its inner to the outer end and adjustable relative to said inner cone, a combined wheel hub and tubular race element having means encompassing and providing in connection with said cones a pair of annular oppositely disposed diverging raceways, said element having an internal shoulder adjacent its inner end, a pair of spaced annular oppositely disposed endwise aligning diverging cages mounted in said raceways and each provided with spaced bearing balls extended therefrom and riding against the walls of said raceways, said housing adjacent the outer end of the inner cone being formed with a peripheral annular flange, a spring pressed wiper device arranged between the shoulder and flange and encompassing said housing, means for connecting said wiper device to said flange, means mounted on said axle housing for maintaining the outer cone in adjusted position, and a releasable confining device for said maintaining means.

2. In a ball bearing structure a tubular axle housing having intermediate its ends a peripheral inherent conoidal shaped part constituting an inner frusto-cone and a peripherally threaded portion disposed inwardly of and extending outwardly from the inner end of said cone, said cone increasing in diameter from its inner to its outer end, a hollow internally threaded outer-frusto cone, encompassing and adjustably connected to said threaded portion and arranged in endwise opposed relation to the said other cone, said outer cone increasing in outer diameter from its inner to the outer end and adjustable relative to said inner cone, a combined wheel hub and tubular race element having means encompassing and providing in connection with said cones a pair of annular oppositely disposed diverging raceways, said element having an internal shoulder adjacent its inner end, a pair of spaced annular oppositely disposed endwise aligning diverging cages mounted in said raceways and each provided with spaced bearing balls extended therefrom and riding against the walls of said raceways, said housing adjacent the outer end of the inner cone being formed with a peripheral annular flange, a spring pressed wiper device arranged between the shoulder and flange and encompassing said housing, means for connecting said wiper device to said flange, means mounted on said axle housing for maintaining the outer cone in adjusted position, a releasable confining device for said maintaining means, said element being formed at its outer end with an upper and a lower pair of oppositely disposed spaced segmental shaped lugs, a head member disposed diametrically with respect to the outer end of the housing, having its ends seated between the lugs of said pairs, abutting the outer edge of and having stems seated against the inner face of said element, and means carried by said lugs and binding against said member for locking the latter to said element.

3. In a ball bearing structure an outer housing having a closed outer end and an inner end formed with an enlarged opening, the lower portion of said housing providing a lubricant well, the top of said housing being provided on its inner face with a pair of spaced parallel stops, an inner non-adjustable frusto-cone, an outer adjustable frusto-cone arranged in endwise alignment and oppositely disposed with the said other cone, a tubular race member disposed between said stops and encompassing said cones, the inner face of said member being formed with oppositely disposed means coacting with said cones providing a pair of oppositely disposed diverging raceways, a pair of spaced annular diverging cages mounted in said raceways and provided with shiftable bearing balls riding against the walls of the raceways, a rotatable supporting element extending through said opening into the housing and being formed with a series of circular parts progressively increasing in diameter from the closed outer end of the housing, each part being of uniform diameter, that part of smallest diameter being peripherally threaded and the others of said parts having plane peripheries, said inner cone being mounted on that part of said element immediately outwardly adjacent that part of said element of greatest diameter, said inner cone abutting the outer end of said part of greatest diameter, said outer cone having its inner face formed of a plane portion and a threaded portion and having the plane portion of its inner face of greater diameter than its threaded portion, said outer cone having the plane portion of its inner face slidably engaging with that part of said element immediately outwardly adjacent that part of said element upon which the inner cone is mounted and having the threaded portion of its inner face adjustably engaging with and extending outwardly beyond the threaded part of said element, said element being formed with a reduced outer end part immediately outwardly adjacent to said threaded part, and means mounted on said outer end part and coacting with means on the outer end of the outer cone for locking the latter from outward movement.

4. In a ball bearing structure an outer housing having a closed outer end and an inner end formed with an enlarged opening, the lower portion of said housing providing a lubricant well, the top of said housing being provided on its inner face with a pair of spaced parallel stops, an inner non-adjustable frusto-cone, an outer adjustable frusto-cone arranged in endwise alignment and oppositely disposed with the said other cone, a tubular race member disposed between said stops and encompassing said cones, the inner face of said member being formed with oppositely disposed means coacting with said cones providing a pair of oppositely disposed diverging raceways, a pair of spaced annular diverging cages mounted in said raceways and provided with shiftable bearing balls riding against the walls of the raceways, a rotatable supporting element extending through said opening into the housing and being formed with a series of circular parts progressively increasing in diameter from the closed outer end of the housing, each part being of uniform diameter, that part of smallest diameter being peripherally threaded and the others of said parts having plane peripheries, said inner cone being mounted on that part of said element immediately outwardly adjacent that part of said element of greatest diameter, said inner cone abutting the outer end of said part of greatest diameter, said outer cone having its inner face formed of a plane portion and a threaded portion and having the plane portion of its inner face of greater diameter than its threaded portion, said outer cone having the plane portion of its inner face slidably engaging with that part of said element immediately outwardly adjacent that part of said element upon which the inner cone is mounted and having the threaded portion of its inner face adjustably engaging with and extending outwardly beyond the threaded part of said element, said element being formed with a reduced outer end part immediately outwardly adjacent to said threaded part, means mounted on said outer end part and coacting with means on the outer end of the outer cone for locking the latter from outward movement, a wiping element receiver anchored to the outer face of and having an opening aligning with the opening in the inner end of the housing, and an annular wiping member bearing against that part of largest diameter of said element and mounted in said receiver.

5. In a ball bearing structure an outer housing having a closed outer end and an inner end formed with an enlarged opening, the lower portion of said housing providing a lubricant well, the top of said housing being provided on its inner face with a pair of spaced parallel stops, an inner non-adjustable frusto-cone, an outer adjustable frusto-cone arranged in endwise alignment and oppositely disposed with the said other cone, a tubular race member disposed between said stops and encompassing said cones, the inner face of said member being formed with oppositely disposed means coacting with said cones providing a pair of oppositely disposed diverging raceways, a pair of spaced annular diverging cages mounted in said raceways and provided with shiftable bearing balls riding against the walls of the raceways, a rotatable supporting element extending through said opening into the housing and being formed with a series of circular parts progressively increasing in diameter from the closed outer end of the housing, each part being of uniform diameter, that part of smallest diameter being peripherally threaded and the others of said parts having plane peripheries, said inner cone being mounted on that part of said element immediately outwardly adjacent that part of said element of greatest diameter, said inner cone abutting the outer end of said part of greatest diameter, said outer cone having its inner face formed of a plane portion and a threaded portion and having the plane portion of its inner face of greater diameter than its threaded portion, said outer cone having the plane portion of its inner face slidably engaging with that part of said element immediately outwardly adjacent that part of said element upon which the inner cone is mounted and having the threaded portion of its inner face adjustably engaging with and extending outwardly beyond the threaded part of said element, said element being formed with a reduced outer end part immediately outwardly adjacent to said threaded part, means mounted on said outer end part and coacting with means on the outer end of the outer cone for locking the latter from outward movement, a wiping element receiver anchored to the outer face of and having an opening aligning with the opening in the inner end of the housing, and an annular wiping member bearing against that part of largest diameter of said element and mounted in said receiver, and a normally closed filtering lubricant intake means at the outer end of the housing.

6. In a ball bearing structure an outer housing having a closed outer end and an inner end formed with an enlarged opening, the lower portion of said housing providing a lubricant well, the top of said housing being provided on its inner face with a pair of spaced parallel stops, an inner non-adjustable frusto-cone, an outer adjustable frusto-cone arranged in endwise alignment and oppositely disposed with the said other cone, a tubular race member disposed between said stops and encompassing said cones, the inner face of said member being formed with oppositely disposed means coacting with said cones providing a pair of oppositely disposed diverging raceways, a pair of spaced annular diverging cages mounted in said raceways and provided with shiftable bearing balls riding against the walls of the raceways, a rotatable supporting element extending through said opening into the housing and being formed with a series of circular parts progressively increasing in diameter from the closed outer end of the housing, each part being of uniform diameter, that part of smallest diameter being peripherally threaded and the others of said parts having plane peripheries, said inner cone being mounted on that part of said element immediately outwardly adjacent that part of said element of greatest diameter, said inner cone abutting the outer end of said part of greatest diameter, said outer cone having its inner face formed of a plane portion and a threaded portion and having the plane portion of its inner face of greater diameter than its threaded portion, said outer cone having the plane portion of its inner face slidably engaging with that part of said element immediately outwardly adjacent that part of said element upon which the inner cone is mounted and having the threaded portion of its inner face adjustably engaging with and extending outwardly beyond the threaded part of said element, said element being formed with a reduced outer end part immediately outwardly adjacent to said threaded part means mounted on said outer end part and coacting with means on the outer end of the outer cone for locking the latter from outward movement, and said race member having its outer diameter gradually increasing from each end thereof to its vertical median to provide for its canting against the inner face of the housing.

7. In a roller bearing a revoluble combined wheel hub and race member, an axle housing extending into said member and formed with means to provide a non-adjustable inner frusto-cone on its periphery, a reduced peripherally threaded portion inset with respect to the inner end of the cone and an outer end portion reduced relatively to said threaded portion, said housing having a polygonal outer end part, an outer adjustable frusto-cone oppositely disposed with respect to the inner cone and threadedly and adjustably engaging with said threaded portion, said outer cone having its outer end provided with outwardly extended spaced apertured means, said member having its inner face provided with means coacting with the said cones forming a pair of oppositely disposed annular diverging raceways, oppositely disposed annular diverging cages carrying bearing balls riding against the walls of said raceways, said member being formed with means for the passage of lubricant directly to between the inner ends of said cones, a plate arranged between said apertured means and having a polygonal shaped opening through which said end part extends, and means coacting with said apertured means and plate for locking the outer cone from movement.

8. In a ball bearing structure means to provide a pair of oppositely disposed spaced frusto-cones having their smallest ends arranged in endwise spaced alignment, a race member encompassing in spaced relation said cones, said member having its inner face provided with means coacting with said cones to form a pair of oppositely disposed diverging raceways, a pair of spaced oppositely disposed sets of spaced bearing balls, the balls of each set being arranged in closely related spirals, the balls of one spiral being staggered with respect to the balls of adjacent spirals, and oppositely disposed frusto-conoidal cages positioned in said raceways, each cage having means for revolubly carrying and retaining spiral arrangement of the balls of a set and with the balls of a set in projected relation to its inner and outer faces to travel against the walls of the raceways, the end balls of each set being positioned in close proximity to the end edges of a cage.

SWENEY MUNSON.